United States Patent [19]

Hankins

[11] 4,306,868
[45] Dec. 22, 1981

[54] MULTI-FUNCTION INSTRUCTIONAL AND RECREATIONAL DEVICE

[75] Inventor: Charles W. Hankins, 101 Broadway, #5, Millbrae, Calif. 94030

[73] Assignees: Charles W. Hankins; Robert C. Devincenzi, ; part interest to each

[21] Appl. No.: 67,281

[22] Filed: Aug. 20, 1979

[51] Int. Cl.³ .............................................. G09B 1/06
[52] U.S. Cl. ..................................... 434/85; 434/159; 434/162; 434/167; 434/259
[58] Field of Search ............... 35/22 A, 9 E, 9 F, 26, 35/60, 61, 62, 63, 64, 65, 73, 76; 40/117; 281/7, 8; 434/81, 85, 159, 167, 259

[56] References Cited

U.S. PATENT DOCUMENTS

| | | | |
|---|---|---|---|
| 342,762 | 5/1886 | Russell | 35/61 |
| 483,371 | 9/1892 | Weissenborn | 35/61 |
| 524,617 | 8/1894 | Slaughter | 35/61 |
| 763,926 | 6/1904 | Powers | 35/60 |
| 794,653 | 7/1905 | Allen | 35/61 |
| 1,805,897 | 5/1931 | Wilkins | 281/8 |
| 1,989,216 | 1/1935 | Shaw et al. | 35/60 |
| 2,095,482 | 10/1937 | Spicciato | 273/284 |
| 2,283,997 | 5/1942 | Jensen | 35/26 UX |
| 2,740,206 | 4/1956 | Schatz | 35/62 |
| 3,024,541 | 3/1962 | Byrum | 35/73 X |
| 3,144,720 | 8/1964 | Kehl | 35/9 E |
| 3,280,499 | 10/1966 | Studen | 35/22 AX |
| 3,478,446 | 11/1969 | McCutcheon | 35/60 X |
| 4,155,446 | 5/1979 | Aronson | 35/26 R |

FOREIGN PATENT DOCUMENTS 6706 of 1912 United Kingdom ............... 35/22 A Primary Examiner—William H. Grieb
Attorney, Agent, or Firm—Warren J. Krauss

[57] ABSTRACT

An instructional and recreational device with means for producing a drawing, means for simultaneously developing ability in spatial relations and numerical or alphabetical usage. The device is a self-contained system including writing implements, game components, and writing surfaces. A plurality of variously shaped game boards are provided with variously shaped apertures therein for receiving complementarily-shaped element blocks having numbers, letters, or the like thereon. By placing a block in an appropriate aperture, a user may develop his spatial relations skills while increasing recognition of language symbols. The device also has means for drawing or writing, including a blackboard and a continuous, rolled supply of drawing paper.

7 Claims, 3 Drawing Figures

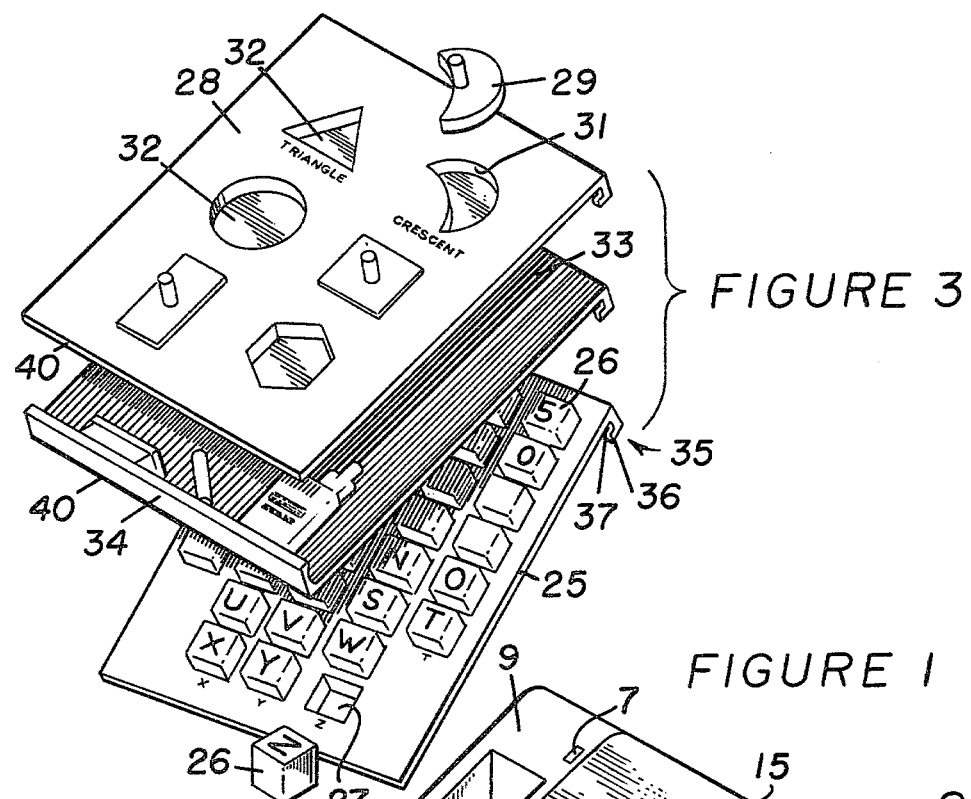

MULTI-FUNCTION INSTRUCTIONAL AND RECREATIONAL DEVICE

BACKGROUND OF THE INVENTION

This invention relates to a multi-function apparatus for developing human skills in spatial relations, language arts, penmanship and sketching.

A self-contained instructional and recreational apparatus is provided which comprises, in one location, a plurality of different writing surfaces and instructional implements.

Such a system has eluded the toy industry for some time. It has apparently been difficult for toy and educational device manufacturers to produce a sturdy, economically fabricated and serviceable multi-purpose device. Numerous attempts have been made in the past to accomplish this, as shown by the prior art, but only certain individual educational functions have been addressed in any one prior art device.

U.S. Pat. Nos. 1,989,216; 3,280,499; 342,762; 483,371; 794,653; 524,617; 3,144,720; and 2,740,206; to Shaw, et al., Studen; Russell; Weissenborn; Allen; Slaughter; Kehl; and Schats, respectively, teach certain of the desired individual concepts, per se, of the present system. However, none of the noted patents address the totality of the multiple functions and the apparatus for performing such functions which are presented in the present combination.

SUMMARY OF THE INVENTION

The instant multi-function instructional and recreational device comprises a podium, having an obliquely inclined bearing surface which selectively mounts and positions a plurality of different writing surfaces and aperture boards for receiving variously shaped fit-in elements. A continuous roll of drawing paper is stretched across the bearing surface for providing a selectively positionable writing surface. The podium is equipped with a storage compartment having suitable recesses for writing implements such as crayons or the like. It is also equipped with means for storing other operative components. The bearing surface is provided with slots for receiving correspondingly dimensioned tabs on any of a plurality of aperture-equipped game boards which can be disposed upon the bearing surface of the podium. In addition to the aperture boards, a blackboard, having a composition surface, may be suitably positioned, by virtue of tabs and slots, on the bearing surface, to provide a surface for writing with chalk or the like.

The accompanying drawing shows, by way of illustration only, the preferred embodiments of the present invention and the principles thereof. It should be recognized that other embodiments of the invention, applying the same or equivalent principles, may be utilized and that structural changes may be made as desired by those skilled in the art, without departing from the spirit of the invention.

BRIEF DESCRIPTION OF THE DRAWING

FIG. 1 is an isometric view of an embodiment of the instant invention, equipped with a rolled paper writing surface;

FIG. 2 is a sectional elevation, taken along the line 2—2 of FIG. 1; and

FIG. 3 is a composite isometric illustration of various game board components of the instant invention.

DETAILED DESCRIPTION

With reference to FIG. 1 in the drawing, the basic structure and principles of operation of the instant invention may be readily appreciated.

At 1 is a podium, conveniently fabricated from light metals or formed plastic, having closed vertical sides and an obliquely oriented flat bearing surface 9. The podium is suitably equipped with a plurality of legs 3 for supporting the podium upon a working surface. A plurality of drilled or formed wells 5 are provided for containing a plurality of writing implements, such as crayons 6, as shown.

At 21 is a deep compartment for containing element blocks, as will be explained more fully hereinafter. The podium bearing surface 9 is provided with a pair of opposed slots 7 for receiving tabs, as will also be explained hereinafter.

Rotatably mounted within the podium, at 11 and 13, are rollers suitably equipped with turning or control knobs, 14. The roller 11 is equipped with a slot 12 for receiving the paper tab 17 of a roll of drawing paper 15 so that the paper can be selectively rolled from the supply roller 13 to the receiving roller 11 by manipulation of the control knobs 14.

Also provided on the podium is a bearing bar, 19, adapted for supportively receiving a plurality of board components, as will be explained hereinafter.

With reference to FIG. 3, the game board components of the instant invention may be readily appreciated. At 25 is a game board suitably fabricated from plastic, pressed wood, or the like, containing a plurality of apertures 27. The apertures are adapted to receive a plurality of element blocks 26 suitably provided with numbers or alphabetical symbols, as shown. The board 25, adjacent each aperture, may be marked with a corresponding number or letter so that each block corresponds to only one appropriate aperture on the board. For illustration purposes, the board is shown marked with the letters "X", "Y", and "Z".

In operation, the user of the device would attempt to match a plurality of loose element blocks with corresponding apertures on the board. It is clear that, by suitably marking the blocks and the aperture board 25, any number of different recognition skills can be stimulated. For example, words could be spelled out adjacent a series of apertures and appropriate blocks could be placed in such apertures to spell out the same words.

At 28 is another type of board equipped with diverse geometrically shaped apertures 31 for receiving correspondingly shaped element blocks 29. The apertures 31 are suitably provided with bottom surfaces 32 to prevent the components 29 from falling through the board. The board surface can be suitably marked with a description of the shape of the aperture into which corresponding blocks are to be placed. For illustration purposes, the upper-most apertures in the board 28 are suitably designated "TRIANGLE", and "CRESCENT."

It is clear that, with imagination, the board and blocks can be adopted for many different instructional themes. For instance, the apertures could be shaped like various animals, buildings or vehicles and a child or other user would have the didactic experience of connecting the physical manifestation with each descriptive word.

At 33 is shown a blackboard or composition surface permitting writing or drawing with chalk or similar materials. The board 33 is equipped with a rail or chalk and eraser supporter 34.

Each of the boards, of which only three are shown as representative, are equipped with formed tab means, shown generally at 35. Each of the tabs 35 has hook means 36 and notch means 37 for firmly, supportively engaging the slots 7 in the podium.

When installed on the bearing surface 9, the boards are held off the writing paper surface 15 by the tabs 35, at one end, and the bearing bar 19 at the other. The bar 19 contacts the under surfaces of the game boards 40. This provision makes it unnecessary to remove or protect the rolled paper 15 when the game boards are installed.

The element blocks 26, when not in use, may be suitably stored in the block container section 21 of the podium. The boards may be stored within the podium, upon suitable shelves 4.

Thus, the preferred embodiments of the invention have been illustrated and described. It must be clearly understood that the preferred embodiments are capable of many variations and modifications and are not limited to the precise details set forth. This invention includes all such variations and modifications as fall within the scope of the appended claims.

I claim:

1. A multi-function device comprising, in combination, podium support means for operatively supporting components of said device, bearing surface means for operatively supporting writing surface means, said writing surface means including a flexible material writing surface, said writing surface means further including means for selectively movably positioning said flexible material writing surface, game component means supportable upon said podium support means, said game component means including rigid member means having apertures therein for receiving element means shaped correspondingly to said apertures, said rigid member means including tab means, said podium support means including slot means for receiving said tab means of said rigid member means for supporting said rigid member means upon said podium support means out of contact with said flexible material writing surface.

2. The invention of claim 1 wherein said apertures are a plurality of different geometric shapes and one of said element means corresponds in shape to one each of said plurality of different aperture shapes.

3. The invention of claim 1 wherein said podium support means further includes bearing bar means for supportingly receiving a portion of said rigid member means and holding said rigid member means out of contact with said flexible material writing surface.

4. The invention of claim 3 wherein said podium support means further include storage means for storing components of said device when said components are not in use.

5. The invention of claim 4 wherein said storage means include well means for receiving a plurality of writing implements.

6. The invention of claim 5 wherein said storage means further include shelve means for receiving said rigid member means.

7. The invention of claim 6 wherein said storage means further include recess compartment means for receiving said element means.

* * * * *